May 21, 1940.    C. E. ANDREWS ET AL    2,201,821
PROCESS OF SEPARATING HYDROCARBON MIXTURES
Filed Oct. 21, 1938
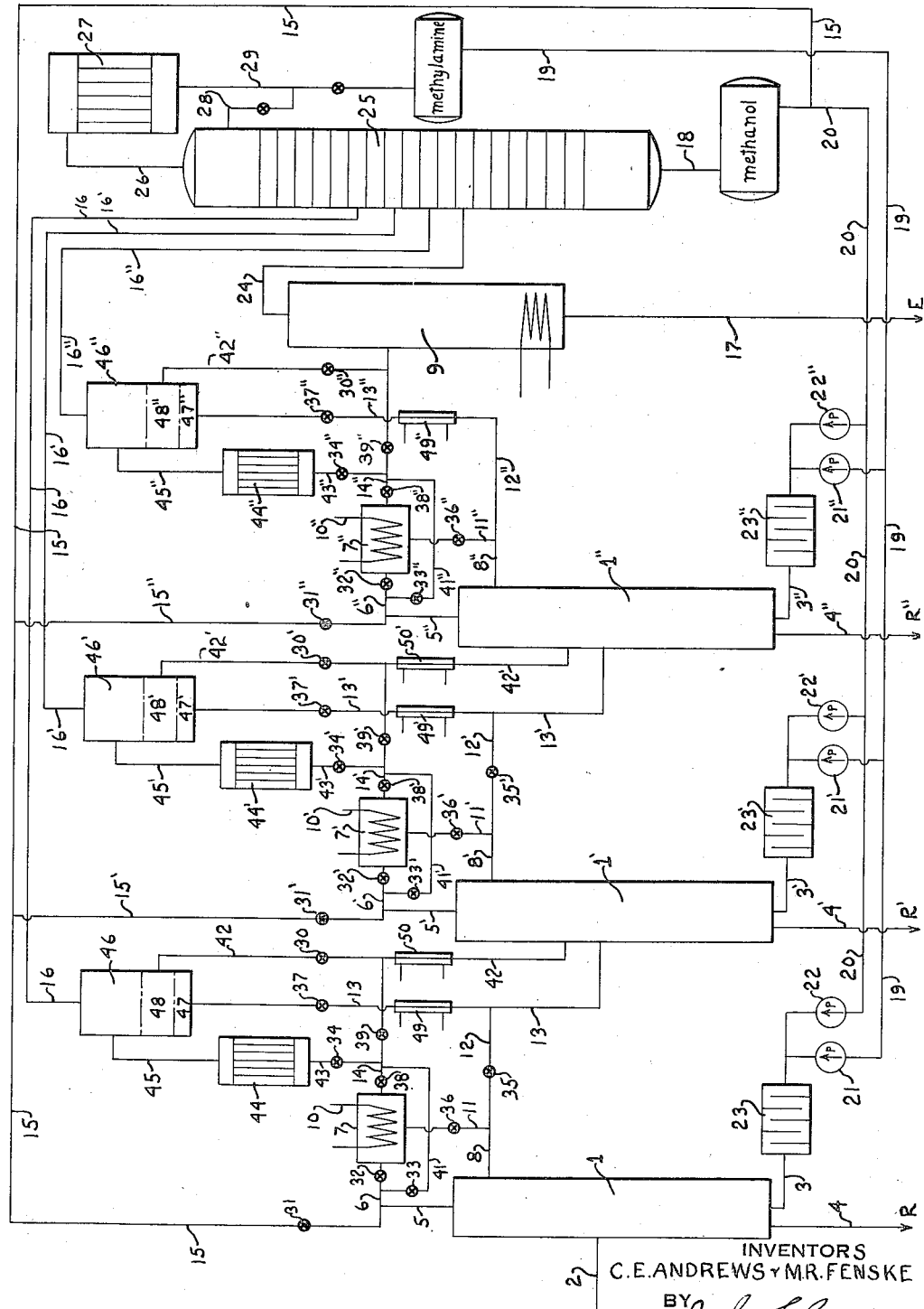
INVENTORS
C. E. ANDREWS & M. R. FENSKE
BY John F. Bergin
ATTORNEY Patented May 21, 1940

2,201,821

UNITED STATES PATENT OFFICE 2,201,821

PROCESS OF SEPARATING HYDROCARBON MIXTURES

Chester E. Andrews, Overbrook, and Merrell R. Fenske, State College, Pa., assignors to Röhm & Haas Company, Philadelphia, Pa.

Application October 21, 1938, Serial No. 236,138

7 Claims. (Cl. 196—13)

This invention relates to a process of separating a mixture of hydrocarbons, such as petroleum fractions, into fractions of different molecular type and different molecular size. More particularly it relates to a process wherein the hydrocarbon mixture is dissolved in a strong methylamine solvent and precipitated therefrom in fractions by progressively reducing the dissolving capacity or strength of said solvent.

This application is a continuation-in-part of our co-pending application Serial No. 155,432 filed July 24, 1937, which in turn is a continuation-in-part of our Patent 2,096,725 granted October 26, 1937.

Petroleum and the various fractions that are commonly obtained from it by distillation consist essentially of hydrocarbons of different molecular type and of different molecular weight. The different types of hydrocarbons that are present in such mixtures may be generally classified into three classes. There are first, the more highly polar types or aromatics. Secondly, there are the aliphatic compounds or paraffins. Thirdly, there are the cycloaliphatic or naphthenes. In any given mixture there will be present compounds that contain groups belonging to two or all three of these general classes, but such compounds can be classified in accordance with their predominating properties in one of the three classes. Within each of these classes the compounds present will differ in molecular weight.

Our invention is based upon the principles, first, that of the three types of hydrocarbons present in petroleum and its distillation fractions the aromatics are in general very much more soluble in methylamine solvents than the other two types; secondly, that within each class compounds of low molecular weight are more soluble than those of high molecular weight, and third, that the solvent capacity of methylamines for hydrocarbons can be varied over a very wide range by changes of temperature or by mixing different methylamines with one another or with non-solvents for hydrocarbons such as ammonia, water and methanol. Through the use of these three principles we have developed ways of resolving the complicated mixture of hydrocarbons that exist in petroleum into fractions which predominate in hydrocarbons of different molecular type and different molecular size without resorting to distillation. Our process thereby avoids the danger of thermal decomposition that accompanies the distillation of the higher molecular weight hydrocarbons and enables one to separate from petroleum viscous fractions that were not heretofore obtainable.

To make this separation in accordance with the present invention the hydrocarbon mixture is treated with a strong methylamine solvent capable of dissolving it entirely or all but the most insoluble fraction. The solution after separation of any undissolved oil, is then treated so as to reduce the dissolving capacity of the methylamines whereby part of the oil will be precipitated. This precipitate is separated and the solution then treated to further reduce the dissolving capacity of the solvent whereby another fraction of the oil will be precipitated. By repeating this operation as many times as is desired, the original mixture may be broken down into as many fractions as is desired. The first fraction will contain the higher molecular weight, very viscous components of the original mixture that are essentially paraffinic in nature. The next fractions will be progressively less viscous and composed of lighter molecular weight paraffinic hydrocarbons. The final fractions will contain the aromatics.

The initial solvent used in practicing this invention may be pure trimethylamine, pure dimethylamine or pure monomethylamine, or a mixture of any two or of all three, or it may be a mixture that contains in addition to one or more methylamines a compound that reduces the solvent capacity of the pure amines. Of the three methylamines, trimethylamine has the greatest solvent capacity for hydrocarbons. Dimethylamine is next in solvent capacity and monomethylamine has the least solvent capacity. By using various combinations of the three, the dissolving capacity of the resulting solvent can be varied over a wide range. It is possible to further widen this range by adding to the methylamine a compound having less capacity for dissolving hydrocarbons such as ammonia or one of the precipitating liquids hereinafter mentioned. What strength solvent should be used at the beginning of the process will depend upon the particular hydrocarbon mixture being treated and can easily be determined by a few simple tests measuring the quantity of different solvent combinations required to completely dissolve a sample of the particular mixture. We prefer to start with a solvent of such strength that it will require from 2 to 4 volumes of solvent to dissolve one volume of the mixture but these limits are not critical and where the mixture is to be divided into a large number of fractions a larger ratio of solvent to hydrocarbon mixture is preferred.

The dissolving capacity of the methylamines for hydrocarbons can be reduced in a number of ways, among which may be mentioned changing the temperature of the solution or reducing the composition of the solvent. We prefer to reduce the dissolving capacity by changing the composition of the solvent as for instance by adding to the solution a precipitating liquid that is miscible with the methylamines and has a lower capacity for dissolving hydrocarbons. The methylamines may then be considered a primary solvent in which various amounts of a modifying solvent are dissolved. These modifying solvents are chemically inert toward the methylamines, are soluble in them, and possess a lower solvency for a particular hydrocarbon type than the methylamines. In the case of the methylamines these modifying solvents are one or more of the following substances: methanol and the low molecular weight alcohols, the lower aliphatic cyanides, water, ammonia, ethers, and ether-alcohols such as polyglycols and the monoalkyl-ethers of polyglycols.

Because of the marked similarity, both physically and chemically, of ammonia and methylamines, it is to be understood that ammonia in any suitable or effective concentrations may be included in the methylamines. Ammonia is particularly effective where trimethylamine in considerable proportions is being used since this combination permits a very wide range in dissolving capacity to be attained. This range of dissolving capacity may exceed that of any other methylamine or methylamine mixture since there are marked differences in the solubility of hydrocarbons in ammonia on one hand, and trimethylamine on the other. However, it is to be understood that ammonia may be used with any one of the methylamines or any mixture of them. As an illustration of the dissolving capacity of ammonia, it is found that whereas a typical dewaxed "180 Pennsylvania neutral oil" is completely soluble in pure trimethylamine and pure dimethylamine and almost, if not entirely, soluble in monomethylamine at temperatures of the order of 80° F., ammonia with the same oil at about this temperature only dissolves about 10% of the oil when about 6 parts of ammonia to one part of oil by weight are mixed.

Our process is particularly adapted to the separation of petroleum fractions such as the heavier distillates and residuums but it is also applicable to crude petroleum and to the hydrocarbon mixtures that exist as coke oven tar and gas tar.

As an illustration of the elementary principles of our invention when applied in a simple way, the data of Tables I and II are given. In obtaining the data of Table I the procedure used was to dissolve 45 cc. of a wax and asphalt free Long residuum oil in 137 cc. dimethylamine, and add methanol (99.9% pure) with agitation or stirring. Part of the oil was precipitated as a liquid phase, allowed to settle, and withdrawn from the methylamine solution phase. Upon the addition of more methanol with stirring another liquid phase separated which was allowed to settle and then withdrawn. The first fraction is called raffinate 1, the second raffinate 2, and the oil remaining in solution when freed of solvent is called extract. By using smaller amounts of methanol in each step the number of raffinates can be multiplied indefinitely. The properties of the different raffinates listed in the table are those of the solvent free material. The dimethylamine used has approximately the following composition: 0.5% monomethylamine, 85.4% dimethylamine and 14% trimethylamine.

TABLE I

Solvent fractionation or precipitation of a wax and asphalt free Long residuum oil Charge: 45 cc. of oil+137 cc. of dimethylamine giving an intial 3 to 1 solvent to oil ratio. Temperature=75° C.

| Fraction number | Cc. of methanol added | Weight percent of original oil | Say. secs. vis.* at— | | Viscosity index |
|---|---|---|---|---|---|
| | | | 100° F. | 210° F. | |
| Original oil | | | 921 | 86.8 | 103 |
| 1 | 14 | 34.6 | 1230 | 105.8 | 107 |
| 2 | 30 | 26.0 | 905 | 86.7 | 104 |
| Oil remaining in solvent | | 36.6 | 540 | 63.4 | 90 |

*Say. secs. vis.=Saybolt seconds viscosity.

The data of Table II were obtained by the same procedure described for Table I except that a more viscous oil was used. The oil was a typical Pennsylvania bright stock of +20° F. pour point, 26.7° A. P. I. gravity, 555° F. flash point and 635° F. fire point.

TABLE II

Solvent fractionation or precipitation of Pennsylvania bright stock using methylamine solvent. Solvent to oil ratio at start: 3 to 1. Solution at start contained 40 cc. of oil and 120 cc. of dimethylamine. The temperature was 75° F.

| Fraction number | Weight percent of original oil | Total cc. of methanol added | Refractive index at 20° C. | Saybolt seconds viscosity at— | | Viscosity index | Percent carbon* |
|---|---|---|---|---|---|---|---|
| | | | | 100° F. | 210° F. | | |
| Original oil | 100 | | 1.4948 | 2255 | 148.7 | 102 | 1.56 |
| Raffinate 1 | 26.0 | 14 | 1.4942 | 2815 | 177.7 | 106 | 1.69 |
| Raffinate 2 | 31.5 | 20 | 1.4937 | 2378 | 156.4 | 104 | 1.49 |
| Raffinate 3 | 22.4 | 52 | 1.4940 | 1875 | 132.2 | 103 | 0.8 |
| Extract | 17.3 | 52 | 1.5010 | 1795 | 119.5 | 93 | 3.3 |

*For percent carbon, samples of the oil were weighed in porcelain plates, placed in an oven maintained at 345° C. for 5 hours with access of air. The carbon remaining on the plate was determined, and the percent carbon calculated on the basis of the original sample. From previous data on bright stocks, the Conradson carbon residue values for the above materials may be estimated approximately by multiplying these values by 0.8.

For a sharper separation of fractions than is obtainable by the simple precipitation procedure illustrated above, we prefer to carry out our process in a system such as is illustrated diagrammatically in the accompanying drawing which combines with the fractional precipitation a countercurrent solvent extraction of each precipitate and a reflux washing of the solution with hydrocarbons separated from the solution at a subsequent stage.

In the system illustrated, columns l, l' and l" are countercurrent phase contacting columns packed with an inert material which serves to bring about intimate contact between the countercurrently flowing phases. We have found columns of the type described in U. S. Patents 2,037,318; 2,037,319 and 2,052,971 particularly suitable. The oil to be separated into fractions is introduced into column l at 2 and is continuously extracted by a methylamine solvent which enters at 3. This solvent is preferably composed of methylamines and a liquid having the property of reducing the solvent capacity of the methylamines, preferably methanol. The methylamine is conveyed to extraction column l from the methylamine storage tank, through line 19, pump 21 and mixer 23. The methanol flows from its storage tank through line 20 and pump 22 to mixer 23. The mixer 23 serves to intimately mix the methanol and methylamine to form a homogeneous liquid and insure the complete solution of the methanol in the methylamines before the mixture is passed into the column l. The methylamine solution which enters column l at 3 being lighter than the oil entering at 2, rises through the packing material where it intimately contacts the descending oil and extracts from it the most soluble materials. That fraction of the oil which has not been dissolved leaves column l through line 4 as the first raffinate R. It may be stripped of any solvent contained in it by any suitable means. The methylamine solution containing dissolved hydrocarbons leaves the extraction column l through line 5. It is then treated as hereinafter described to precipitate a part of the dissolved hydrocarbons, which precipitate is at least in part returned to extraction column l through line 8 for countercurrent contact with the ascending solution, and in part is led through line 13 to extraction column l'. The precipitation may be accomplished in a variety of ways, depending upon the particular hydrocarbon mixture being treated, the number of fractions into which it is desired to separate it, and other conditions of operation. These various methods and the operation of the apparatus provided for precipitating a portion of the dissolved hydrocarbons will hereinafter be described, but whatever the method of precipitation the solution that remains after precipitation of a portion of the oil is led through line 42 to extraction column l'. This solution leaves fractionating column l' through line 5' where it is again treated to precipitate another fraction of oil which in turn is at least in part returned to fractionating column l' through line 8' to countercurrently contact the solution that enters through line 42 and in part may be led through line 13' to extraction column l". The solution remaining after this second precipitation of oil is then led through line 42' to extraction column l". It leaves fractionating column l" through line 5" where it is again treated to precipitate a third portion of oil, which precipitate is returned to fractionating column l" through line 8" for countercurrent contact with the solution entering through line 42'. The solution remaining after the third precipitation of oil is led to a still 9 in which the solvent is distilled off from the remainder of the oil.

This solvent is led through line 24 to a conventional fractionating column 25 in which the methylamine is separated from the methanol. The methylamine vapors leave this column through line 26 and are condensed in condenser 27. A portion of the condensed methylamine is returned to fractionating column 25 through line 28 to provide reflux and the rest passes through line 29 to the methylamine storage tank. Methanol leaves the fractionating column 25 through line 18 to the methanol storage tank. The residual oil in still 9 is withdrawn through line 17 and is indicated as E.

Fresh solvent mixtures enter the bottoms of extraction columns l' and l", through 3' and 3" respectively. The compositions of these solvents are regulated by metering pumps 21' and 22', 21" and 22", and are of progressively lower dissolving capacity than the solvent used in column l. The precipitated oil entering these fractionating columns through 8' and 8" respectively, after countercurrently contacting the solutions entering them at 42 and 42' respectively, continues to descend the columns and is subjected to an extraction by fresh solvent entering at 3' and 3" respectively. Raffinate from column l' is withdrawn at 4' and is indicated at R'; raffinate from column l" is withdrawn at 4" and is indicated as R".

The precipitation of oil in the various stages of the process may be accomplished either by reducing the temperature of the solution or by changing the composition of the solvent. This latter may be accomplished either by adding methanol to the solution or by vaporizing a part of the methylamine. There are therefore three methods by which the dissolving capacity of the solvent can be reduced. One is by cooling, the second by adding methanol and the third by removing methylamines. Or, any two or all three of these methods may be used in combination.

When cooling alone is the method used for precipitating oil from the solution phase leaving extraction column l, valves 32, 36, 38, and 39 are opened to the proper degree and valves 31, 33, 34, 37, and 30 are closed. The solution leaving column l is led through lines 5 and 6 to separator 7 where it is cooled by means of cooling coil 10. The precipitated oil phase leaves separator 7 through line 11 and is led at least in part through line 8 to extraction column l. If desired, part of the oil phase may be led through lines 12 and 13 to fractionating column l'. Solution phase leaves separator 7 through line 14 and thence through line 42 to extraction column l'. Cooling as the sole means of reducing the dissolving capacity of the solvent is not a universally practical means because temperature reduction cannot be extended indefinitely without expensive refrigeration and because there are many advantages in extracting at higher temperatures where the viscosity of the phases is markedly reduced and molecular activity increased. For these reasons it is generally advisable when using cooling or refrigeration as a means of precipitating oil to combine with it at least one of the other methods of changing the composition of the solvent.

When it is desired to change the dissolving capacity of the solvent in the solution leaving column l by adding methanol to it, this is accomplished by opening valves 31, 32, 38, 39, and 36 and closing valves 33, 34, 37, and 30. When this is done the solution phase leaving fractionating column l through line 5 is mixed with methanol which is conveyed from the methanol storage tank through line 15 and the mixture is carried through line 6 to separator 7 where a precipitated oil phase separates from a solution phase. As when cooling is the means of causing the precipitate, the precipitated oil leaves separator 7 through line 11 and may be wholly returned to fractionating column 1 through line 8 or may be in part led through lines 12 and 13 to extraction column 1'. The solution phase in separator 7 is again led through lines 14 and 42 to extraction column 1'. A disadvantage of this method of operation is that it sometimes tends to increase the solvent to oil ratio in subsequent stages of the process beyond that which might be desirable.

The third method of reducing the dissolving capacity of the solvent; that is, removing part of the methylamine contained in the solution phase leaving extraction column 1, is accomplished by closing valves 31, 32, 36, 38, and 39 and opening valves 33, 34, 35, 37, and 30. The solution phase leaving extraction column 1 then passes to vaporizer 44 by means of lines 5, 6, 41, 14, and 43. In vaporizer 44 it is heated by steam or other suitable means to vaporize part of the solvent. Both vapors and liquid leave the vaporizer 44 through line 45 and are led into separator 46 where the liquid phase is separated from the vapors. To aid in the vaporization of methylamines, vaporizer 44 and separator 46 may, if desired, be operated under a lower pressure than the extraction columns. When so operating suitable pumps may be placed in lines 13 and 42 to bring the liquid phases in separator 46 up to the proper pressure for further processing. As the methylamine is the most volatile component of the solution entering vaporizer 44, the vapors in separator 46 will be primarily methylamine but will contain some methanol and they are led through line 16 to be fractionally distilled in fractionating column 25. The removal of methylamine from the solution in separator 46 reduces the dissolving capacity of the solvent, whereby an oil phase indicated as 47 and a solution phase indicated as 48 are formed. Oil phase leaves separator 46 through line 13 and is at least in part returned to extraction column 1 through lines 12 and 8 and may in part be led to fractionating column 1'. Solution phase from separator 46 is led by means of line 42 to extraction column 1'. Heat exchangers 49 and 50 in lines 13 and 42 are provided to adjust the temperature of the liquid phases 47 and 48 to the proper degree for further processing.

In the operation of the process it is frequently advantageous to utilize all three of the precipitation methods. By so doing at each stage of the process the solvent composition and solvent to oil ratio can be adjusted to meet the requirements of the succeeding stage and at the same time any desired amount of precipitated oil can be returned to the extraction column 1. When all three of the methods are utilized, valve 31 is opened to admit the proper amount of methanol to the solution leaving column 1, valves 32, 38, 34, 37, 30, and 36 are opened, and valves 33, 35, and 39 are closed. The solution phase leaving extraction column 1 mixed with the desired amount of methanol from line 15 is then led through line 6 to separator 7 in which the temperature is adjusted to provide the desired amount of precipitated oil. The solution phase from separator 7 passes through lines 14 and 43 to vaporizer 44 in which it is heated to vaporize the desired amount of methylamine. The mixture of vapor and solution then passes to separator 46 in which the vapors are separated from the solution and the solution in turn separates into two phases indicated at 47 and 48. Solution phase 48 as previously, passes through line 42 to fractionating column 1' and oil phase 47 passes through line 13 to column 1'. The oil phase precipitated in separator 7 is returned through lines 11 and 8 to extraction column 1.

In the foregoing description of the methods of reducing the dissolving capacity of the solvent, reference has been made to separator 7, cooling coil 10, vaporizer 44, and separator 46 with their connecting lines and valves. Separator 7', cooling coil 10', vaporizer 44', and separator 46' as well as separator 7'', cooling coil 10'', vaporizer 44'', and separator 46'' together with their connecting lines and valves are operated in identically the same manner except, of course, that final solution phase in the last unit of the series is led to the still 9 instead of an extracting column.

In the operation of the apparatus, column 1 performs the normal function of an extracting column. Fractionating column 1' performs the double function of extracting any precipitate led into it through line 13 and of countercurrently contacting the solution phase entering through line 42 with oil subsequently precipitated from it. The fresh solvent entering column 1' at 3' may be adjusted by means of pumps 21' and 22' to be substantially the same as the composition of the solvent that enters the column through line 42. Any precipitated oil entering column 1' through line 13 descends and is countercurrently extracted by the ascending solvent which enters at 3'. The solution phase which enters column 1' through line 42 rises in the column and passes by means of lines 5' and 6' to the precipitating apparatus 7', 44', and 46'. The precipitated oil which is returned from either separator 7' or separator 46' to extracting column 1' through line 8' passes downwardly in countercurrent contact with the ascending solution. It serves to strip from the ascending solution phase the least soluble of the hydrocarbons contained in it and to give up to the solution phase its most soluble components. As this column operates, therefore, any precipitated oil from separators 7' or 46' which enters it is countercurrently extracted with fresh solvent, the extract thus formed is mixed with the solution phase from separators 7 or 46, this mixture is stripped of its least soluble components by reflux oil from separator 7' or 46' and the stripping oil thus formed mixed with precipitated oil from separators 7 or 46 through line 13. The function and operation of column 1'' is identical with that of fractionating column 1'.

In practicing the process it has been found highly desirable to maintain different parts of columns 1, 1' and 1'' at different temperatures. For example, the tops of the columns are preferably maintained at much lower temperature than the bottoms and, in general, it is preferable to reduce the temperature in the direction of solvent flow. This temperature distribution may be gradual along the column or decidedly stepwise in character. Since the methylamines are gaseous at ordinary temperatures and pressures the process is carried out under sufficient pressure to maintain them in liquid phase.

By means of the apparatus illustrated the process is capable of separating the original oil into four fractions, indicated as R, R', R'', and E. If additional fractions are desired, they may be obtained by adding additional fractionating and precipitating units in series to the apparatus illustrated. The first raffinate R will be a viscous fraction composed of the higher molecular weight paraffinic hydrocarbons contained in the mixture. The fraction R' will be less viscous and composed primarily of paraffinic hydrocarbons of intermediate molecular weight. Fraction R" will be still less viscous and will be composed of the lower molecular weight paraffinic hydrocarbons and a substantial proportion of the naphthenes contained in the original oil. Extraction portion E will be composed primarily of the aromatic components of the original oil.

In the foregoing description of the process, methanol has been referred to as illustrative of a liquid capable of reducing the solvent capacity of the methylamine, but any other liquid having the same properties may be used in its place. So also may other extracting solvents be used in place of methylamines in the apparatus illustrated in the drawing, particularly where cooling is a satisfactory method of precipitating a part of the dissolved oil or where the solvent selected is miscible with a non-solvent for the material being extracted. The apparatus illustrated is not therefore limited to extraction by means of methylamines but is most conveniently operated with methylamines as solvent because of ease with which these solvents may be adjusted to any desired dissolving capacity.

For extracting non-viscous materials of low molecular weight such as gasolines, methylamine-water solutions are effective solvents. In some cases these solvents may be heavier, rather than lighter, than the mixture being extracted. But the same methods of operation and the same principles apply, and essentially all that is needed to visualize the flow in cases of solvents heavier than the mixture being extracted is to turn the apparatus in Figure I end for end. That is, the same operations are conducted on the solvent solutions whether the solvent is lighter or heavier than the hydrocarbon mixture being extracted.

It should also be understood that while vertical columns have been illustrated as the extraction apparatus, other phase contacting means, such as mixers and settlers, are applicable.

We claim:

1. The process of separating mixtures of hydrocarbons containing molecules of different types and weights, which comprises dissolving said mixture in a methylamine solvent, reducing the dissolving capacity of the solvent in stages so as to form a series of raffinates and a final extract, the reduction in dissolving capacity in each stage being such that the first raffinates formed contain predominantly paraffinic hydrocarbons of high molecular weight range, the final raffinates containing predominantly naphthenic hydrocarbons and the extract predominantly aromatic hydrocarbons.

2. The process of separating mixtures of hydrocarbons containing molecules of different types and weights, which comprises dissolving said mixture in a methylamine solvent, reducing the dissolving capacity of said solvent to such a degree as to form an extract phase and a raffinate phase in which the raffinate contains predominantly paraffinic hydrocarbons of higher molecular weight range, separating the phases and reducing the dissolving capacity of the solvent in the extract phase to such a degree as to form a second extract phase and a second raffinate phase in which the raffinate contains predominantly paraffinic hydrocarbons of lower molecular weight range, separating the phases and reducing the dissolving capacity of the solvent in the second extract phase to such a degree as to form a third extract phase containing predominantly aromatic hydrocarbons and a raffinate phase containing predominantly naphthenic hydrocarbons, and separating the phases.

3. The process of separating mixtures of hydrocarbons containing molecules of different types and weights, which comprises dissolving said mixture in a methylamine solvent, adding a precipitant to the solution in such amount as to form an extract phase and a raffinate phase in which the raffinate contains predominantly paraffinic hydrocarbons of higher molecular weight range, separating the phases, adding precipitant to the extract phase in such amount as to form a second extract phase and a second raffinate phase in which the raffinate contains predominantly paraffinic hydrocarbons of lower molecular weight range, separating the phases and adding precipitant to the extract phase in such amount as to form a third extract phase containing predominantly aromatic hydrocarbons and a raffinate phase containing predominantly naphthenic hydrocarbons and separating the phases.

4. The process of separating mixtures of hydrocarbons containing molecules of different types and weights, which comprises dissolving said mixture in a methylamine solvent, adding methanol to the solution in such amount as to form an extract phase and a raffinate phase in which the raffinate contains predominantly paraffinic hydrocarbons of higher molecular weight range, separating the phases, adding methanol to the extract phase in such amount as to form a second extract phase and a second raffinate phase in which the raffinate contains predominantly paraffinic hydrocarbons of lower molecular weight range, separating the phases and adding methanol to the extract phase in such amount as to form a third extract phase containing predominantly aromatic hydrocarbons and a raffinate phase containing predominantly naphthenic hydrocarbons and separating the phases.

5. The process of separating mixtures of hydrocarbons containing molecules of different types and weights, which comprises dissolving said mixture in a methylamine solvent, adding ammonia to the solution in such amount as to form an extract phase and a raffinate phase in which the raffinate contains predominantly paraffinic hydrocarbons of higher melecular weight range, separating the phases, adding ammonia to the extract phase in such amount as to form a second extract phase and a second raffinate phase in which the raffinate contains predominantly paraffinic hydrocarbons of lower molecular weight range, separating the phases and adding ammonia to the extract phase in such amount as to form a third extract phase containing predominantly aromatic hydrocarbons and a raffinate phase containing predominantly naphthenic hydrocarbons and separating the phases.

6. The process of separating mixtures of hydrocarbons containing molecules of different types and weights, which comprises dissolving said mixture in a methylamine solvent, adding water to the solution in such amount as to form an extract phase and a raffinate phase in which the raffinate contains predominantly paraffinic hydrocarbons of higher molecular weight range, separating the phases, adding water to the extract phase in such amount as to form a second extract phase and a second raffinate phase in which the raffinate contains predominantly paraffinic hydrocarbons of lower molecular weight range, separating the phases and adding water to the extract phase in such amount as to form a third extract phase containing predominantly aromatic hydrocarbons and a raffinate phase containing predominantly naphthenic hydrocarbons and separating the phases.

7. The process of separating mixtures of hydrocarbons containing molecules of different types and weights, which comprises dissolving said mixture is a solvent composed of at least one methylamine and a modifying solvent having only slight dissolving capacity for said hydrocarbons, increasing the concentration of the modifying solvent to such degree as to form an extract phase and a raffinate phase in which the raffinate contains predominantly paraffinic hydrocarbons of higher molecular weight range, separating the phases, and increasing the concentration of the modifying solvent in the extract phase to such degree as to form a second extract phase and a second raffinate phase in which the raffinate contains predominantly paraffinic hydrocarbons of lower molecular weight range, separating the phases and increasing the concentration of the modifying solvent in the second extract phase to such a degree as to form a third extract phase containing predominantly aromatic hydrocarbons and a raffinate phase containing predominantly naphthenic hydrocarbons, and separating the phases.

CHESTER E. ANDREWS.
MERRELL R. FENSKE.